United States Patent
Kesavan et al.

(10) Patent No.: US 6,220,405 B1
(45) Date of Patent: Apr. 24, 2001

(54) FRICTION MATERIAL FOR DRUM-IN-HAT DISC BRAKE ASSEMBLY

(75) Inventors: Sunil Kesavan; Andris A. Staklis, both of Troy; Joseph B. Russik, White Lake Township; Peter H. S. Tsang, West Bloomfield, all of MI (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/430,594

(22) Filed: Oct. 29, 1999

Related U.S. Application Data

(63) Continuation-in-part of application No. 08/886,769, filed on Jul. 2, 1997, now abandoned.

(51) Int. Cl.$^7$ .................................................. F16D 69/00
(52) U.S. Cl. .................................... 188/251 A; 188/70 R; 188/250 G
(58) Field of Search .......................... 188/251 A, 251 R, 188/251 M, 70 R, 218 R, 71.1, 73.1, 250 B, 250 G; 192/107 M; 523/149, 152, 216, 209, 451; 524/493, 445, 451; 106/36; 427/386, 387

(56) References Cited

U.S. PATENT DOCUMENTS

| | | | |
|---|---|---|---|
| 3,673,276 | * | 6/1972 | Keller et al. ..................... 188/251 A |
| 3,725,334 | * | 4/1973 | Popp et al. . |
| 4,111,891 | * | 9/1978 | Reynolds, Jr. . |
| 4,119,591 | * | 10/1978 | Aldrich ............................. 188/251 A |
| 4,324,706 | * | 4/1982 | Tabe et al. ............................ 523/149 |
| 4,352,750 | * | 10/1982 | Eschen . |
| 4,593,070 | * | 6/1986 | Oyama et al. . |
| 4,657,951 | * | 4/1987 | Takarada et al. . |
| 4,665,108 | * | 5/1987 | Nakagawa et al. . |
| 4,785,040 | * | 11/1988 | Gupta et al. . |
| 4,854,423 | * | 8/1989 | Evans et al. . |
| 4,920,159 | * | 4/1990 | Das et al. . |
| 5,180,037 | * | 1/1993 | Evans . |
| 5,322,145 | * | 6/1994 | Evans . |
| 5,344,711 | * | 9/1994 | Kanzaki et al. . |
| 5,385,216 | * | 1/1995 | Kulczycki . |
| 5,433,774 | * | 7/1995 | Kapl et al. . |
| 5,516,816 | * | 5/1996 | Samuels . |
| 5,529,666 | * | 6/1996 | Yesnik . |
| 5,639,804 | * | 6/1997 | Yesnik . |
| 5,707,905 | * | 1/1998 | Lam et al. . |
| 5,753,018 | * | 5/1998 | Lamport et al. . |
| 5,753,356 | * | 5/1998 | Lam et al. . |
| 5,821,282 | * | 10/1998 | Formolo ............................ 188/251 A |
| 5,971,113 | * | 10/1999 | Kesavan et al. ................. 188/251 A |

* cited by examiner

*Primary Examiner*—Douglas C. Butler

(57) ABSTRACT

A drum-in-hat disc brake assembly is disclosed having a drum brake shoe with a friction material comprising a phenolic polymer resin having incorporated into the polymer chain one or more inorganic atom-containing groups selected from the group consisting of a boron-containing group, a phosphorous-containing group, a nitrogen-containing group, a silicon-containing group, and a sulfur-containing group.

17 Claims, No Drawings

FRICTION MATERIAL FOR DRUM-IN-HAT DISC BRAKE ASSEMBLY

This is a continuation-in-part of U.S. patent application Ser. No. 08/886,769, filed Jul. 2, 1997, now abandoned.

FIELD OF THE INVENTION

This invention relates generally to friction materials, and more specifically to friction materials for use in the drum brake shoe of a drum-in-hat disc brake assembly.

BACKGROUND OF THE INVENTION

For many years, drum brakes were the most predominant type of brakes used in automotive and other motor vehicle applications. In recent years, however, disc brakes have become more and more widely used. In some cases, disc brakes have been used on only the front wheels of the vehicle and drum brakes used on the rear wheels, but disc brakes are now being used on both front and rear brakes with increasing frequency.

Although disc brakes provide many advantages over drum brakes, one limitation they have relates to parking brake or emergency brake applications. Unlike drum brakes, which can readily double as parking brakes, disc brakes require special modifications in order to perform that function. This limitation of disc brakes is not typically a problem on a vehicle with front disc brakes and rear drum brakes because the rear drum brakes can double as the parking brake. When both front and rear brakes are disc brakes, however, the disc brakes must be modified in order to perform the parking brake function.

One such disc brake configuration involves adapting the disc brake caliper to include components that will compress the piston and brake pads against the brake disk when the parking brake is actuated. This approach increases the complexity of the caliper mechanism and can have problems with reliability. Also, the use of disc brakes for parking can change the static/dynamic friction ratio of the disc friction material, which can lead to undesirable noise generation. An alternative modification of disc brakes to function as parking brakes is known as the drum-in-hat approach. With this approach, a small brake drum is incorporated into the hat section of the disc brake rotor. Drum-in-hat brake assemblies are well-known in the art and are described, for example in U.S. Pat. Nos. 5,180,037, 5,385,216 and 5,529,149, the disclosures of which are incorporated herein by reference. When the parking brake is actuated, a small brake shoe is applied to engage the drum and prevent the wheel from moving. The drum-in-hat approach for parking brakes with disc brake assemblies has become a popular approach due to its reliability and low cost. One problem experienced by drum-in-hat disc brake assemblies has been degradation of the drum brake shoe friction material due to heat buildup in the brake assembly. This problem is particularly severe in heavy duty brakes used on vehicles with gross vehicle weights in excess of 4000 pounds, and is quite surprising as it can occur from repeated application of the disc brakes without the parking brake even being actuated.

Traditional drum brake shoe friction materials are typically rolled into a sheet of friction material that can be cured and cut into brake segments. While this is an efficient way of manufacturing friction material and provides satisfactory friction materials for conventional drum brakes, the liquid resins required for this process have been found to be insufficient to meet the stringent heat-resistance demands of drum-in-hat brake shoes. Moreover, even many conventional solid phenolic resins typically used for compression-molded disc brake pads are unable to withstand sustained temperatures in excess of 450° F., resistance to which has now been found to be necessary in order to meet the demanding standards for these severe drum-in-hat brake shoe applications.

SUMMARY OF THE INVENTION

It has now been found according to the present invention that effective friction materials for the drum brake shoes of drum-in-hat disc brake assemblies are provided by incorporating into the resin matrix of the friction material at least one phenolic polymer resin having incorporated into the polymer chain one or more inorganic atom-containing groups selected from the group consisting of a boron-containing group, a phosphorous-containing group, a nitrogen-containing group, a silicon-containing group, and a sulfur-containing group. Such disc brake assemblies can provide effective parking brake friction even after repeated application of the parking and/or the disc brakes.

DESCRIPTION OF THE PREFERRED EMBODIMENTS

Inorganic-modified phenolic resins are well-known in the polymer arts and are described, for example, in A. Knop and W. Scheib, *Chemistry and Application of Phenolic Resins*, Springer-Verlag, New York, the disclosure of which is incorporated by reference in its entirety. The phenolic resin is preferably a phenol formaldehyde resin such such as resole, novolac or phenolic-triazine, but may also include amounts of other types of resins, such as bismaleimide-triazine. Phenolic resins typically consist of a number of phenolic ring structures linked together by methylene linking groups to form a polymer chain. The above-described inorganic moieties are incorporated into the phenolic polymer chain (as opposed to being incorporated as a pendant side group on the chain). This is preferably accomplished by replacing one or more of the methylene linking groups with a boron-containing group, a phosphorous-containing group, a nitrogen-containing group, a silicon-containing group, or a sulfur-containing group. The resin may contain combinations of these groups by replacing various methylene linking groups throughout the polymer chain with different moieties.

Modified phenolic resins having boron moieties, phosphorous moieties, nitrogen moieties, silicon moieties, or sulfur moieties at the methylene linking group positions in the resin are well-known in the polymer industry, and include Durite® RD-4545 from Borden Chemicals (boron-modified phenolic resin), F-4109 from FERS Resins S.A. (Spain) (boron-modified phenolic resin), HRJ217A or HRJ-381 from Schenectady Chemicals Inc. (phosphorous-modified phenolic resin), F-4514 or F-4530 from FERS Resins S.A. (Spain)(phosphorous-modified phenolic resin), and 9587RP from Bakelite (Germany)(boron-phosphorous-nitrogen-modified phenolic resin). Incorporation of silicon moieties at the methylene linking group position of phenolic resins is well-known in the art and is described, for example, in U.S. Pat. Nos. 2,258,218, 2,836,740, and 2,842,522, as well as DE OS 1,694,974 and DE PS 937,555. As used herein, the term "silicon-containing group" is distinguished from and does not include silicone (i.e., organopolysiloxane) groups. Techniques for incorporation of sulfur-containing group at the methylene linking group position of phenolic resins are described by J. Scheiber, *Chemie und Technologie der künstlichen Harze*, Stuttgart, Wissenschaftl, Verlagsges, 1943, and M. Cherubim, *Kunststoff Rundschau* 13, 235 (1966).

A phenolic resin may be modified with nitrogen by reacting the resin with a compound having at least one, and preferably at least two reactive nitrogen groups capable of reacting with the phenolic hydroxy groups on the resin. Such reactive nitrogen compounds include, but are not limited to, dicyandiamide, urea, melamine, guanidine, and thiourea, as described in U.S. Pat. Nos. 3,223,668 and 5,473,012.

Alternatively, mixtures of resins modified with different inorganic moieties or combinations of different inorganic moieties may also be used. One such preferred combination utilizes a resin containing boron modification (e.g., a boron-modified or B-P-N-modified resin) and a phosphorus-modified phenolic resin. In this preferred combination, the weight ratio of boron-containing resin to phosphorus-modified resin preferably ranges from 5:1 to 0.2:1, and more preferably from 2:1 to 1:1.

The friction material used in the practice of the present invention preferably comprises at least 3 weight percent and more preferably at least 6 weight percent of inorganic-modified phenolic resin, and can comprise up to 20 weight percent and more preferably up to 10 weight percent of inorganic-modified resin.

The friction material used in the practice of the invention can also contain other resinous binders in addition to the above-described inorganic modified phenolic resins. Resins for use as the binder of the composition of this invention include non-heterocyclic aromatic polymers such as phenolics and phenolic derivatives, aromatic polyamides, aromatic polyesters, and other aromatic polymers such as polyphenylene and mesophase pitch, modified phenolic resins as for example, phenolic resins in which the hydroxyl group has been derivatized as for example, with a crosslinkable group such as cyanate, epoxy and alkyl groups, phenolic triazine resins, and copolymers and mixtures thereof.

The friction material used in the practice of the present invention may contain, based upon the total weight of the composition, from about 0.5 percent to about 99 percent, preferably from about 3 percent to about 60 percent, more preferably from about 6 percent to about 55 percent and most preferably from about 6 percent to about 45 percent by weight, of the above-mentioned binders, including the inorganic modified phenolic resins.

The friction material used in the practice of the invention can also contain various reinforcing fibers (e.g., aramid, steel, acrylic, and, although no longer widely used, asbestos), metal powders (e.g., iron, copper, brass, zinc, aluminum, antimony, and the like), solid lubricants (e.g., tin sulfide, iron sulfide, molybdenum disulfide, graphite, coke, antimony trisulfide), abrasives (e.g., magnesia, silica, iron oxide, alumina, zirconia, tin oxide, chrome oxide, iron chromite, rutile, and the like), organic fillers (e.g., rubber particles, cashew nut shell particles, nitrile rubber particles), and inorganic fillers (e.g., barytes, gypsum, mica, titanates, and the like). Other materials and additives may be added as well, as is known in the art. The relative amounts of these materials will vary widely depending on the desired characteristics of the particular application, and can be readily determined by one skilled in the art. In one preferred embodiment of the invention, the friction material contains from 3 to 55 weight percent bauxite and/or from 2 to 30 weight percent reinforcing whiskers, preferably attapulgite clay whiskers, but also other reinforcing whiskers like potassium titanate, gypsum, calcium silicate, or alumina silicate.

The friction material used in the practice of the present invention can be prepared by pressing the friction composition into the desired shape and curing. The material is generally pressed at pressures of 500 to 15,000 psi and preferably 1000 to 10,000 psi. Pressing temperatures can range from ambient temperatures to 400° F. After pressing, the friction material is preferably post cured by convective, conductive, radiant, or microwave heating. Generally, the lower the degree of curing that takes place during the pressing operation (usually because the pressing takes place at a low temperature and/or for a short duration), the greater is the need for some sort of post-press cure.

After curing, the friction material is subjected to finishing operations, such as trimming, drilling mounting holes or other openings if needed, painting if desired, and other typical finishing operations as is known in the art. Then the friction material is mounted onto a drum brake shoe by conventional means such as screws, bolts, rivets, and/or adhesive, along with a backing plate if desired, and incorporated into the drum-in-hat brake assembly. Alternatively, the friction material can be integrally molded onto the brake shoe in conjunction with adhesive and/or mechanical attachment-enhancing means.

The invention is further described in the following examples.

Preparation 1

A friction material composition was prepared with the following ingredients:

| Component | Weight (g) |
| --- | --- |
| Abrasives | 430 |
| Steel fiber | 200 |
| Kevlar and other reinforcing materials | 130 |
| Solid and depolymerized rubbers | 50 |
| Phosphorus-modified resin | 40 |
| Phosphorus-Boron-Nitrogen-modified resin | 40 |
| Liquid resole resin | 40 |
| Lubricants | 40 |

All dry ingredients were weighed into containers using a scale with 0.1 gram accuracy, and the depolymerized rubber was added to a separate container using the same scale. The total combined weight of solid and liquid components was 1.0 kg. The solid rubber, abrasives, lubricants, and reinforcing materials were mixed for five minutes using a paddle mixer with rotating choppers; all other dry ingredients except for the steel fiber were then added and mixed for an additional three minutes. With the mixer plow and choppers still running, the depolymerized rubber was added over a four minute period, after which the steel fiber was introduced into the mixer. Mixing then continued for another six minutes to give a total mixing time of eighteen minutes. The contents of the mixer were then emptied into a suitable container and formed into drum-in-hat linings as described below in Examples 1–2.

EXAMPLE 1

The friction material described in Preparation 1 was weighed and compression molded at 8,000 psi and 320° F. for 200 seconds, with adequate time for degassing. Linings were then either bonded or riveted to drum shoes according to the part specifications.

EXAMPLE 2

The friction material described in Preparation 1 was weighed and compression molded at 10,000 psi and 340° F.

for 180 seconds, with adequate time for degassing. Linings were then either bonded or riveted to drum shoes according to the part specifications.

Preparation 2

A friction material composition was prepared with the following ingredients:

| Component | Weight (g) |
| --- | --- |
| Abrasives | 440 |
| Steel fiber | 200 |
| Glass fiber | 100 |
| Phosphorus-modified resin | 80 |
| Solid and depolymerized rubbers | 50 |
| Liquid resole resin | 40 |
| Lubricants | 40 |
| Curing agents and resin reinforcers | 30 |
| Kevlar ® aramid fiber | 20 |

All dry ingredients were weighed into containers using a scale with 0.1 gram accuracy, and the depolymerized rubber was added to a separate container using the same scale. The total combined weight of solid and liquid components was 1.0 kg. The solid rubber, abrasives, lubricants, and reinforcing materials were mixed for five minutes using a paddle mixer with rotating choppers; all other dry ingredients except for the steel fiber were then added and mixed for an additional three minutes. With the mixer plow and choppers still running, the depolymerized rubber was added over a four minute period, after which the steel fiber was introduced into the mixer. Mixing then continued for another six minutes to give a total mixing time of eighteen minutes. The contents of the mixer were then emptied into a suitable container and formed into drum-in-hat linings as described below in Examples 3–4.

EXAMPLE 3

The friction material described in Preparation 2 was weighed and compression molded at 8,000 psi and 320° F. for 200 seconds, with adequate time for degassing. Linings were then either bonded or riveted to drum shoes according to the part specifications.

EXAMPLE 4

The friction material described in Preparation 2 was weighed and compression molded at 10,000 psi and 340° F. for 180 seconds, with adequate time for degassing. Linings were then either bonded or riveted to drum shoes according to the part specifications.

Preparation 3

A friction material composition was prepared with the following ingredients:

| Component | Weight (g) |
| --- | --- |
| Abrasives | 440 |
| Steel fiber | 200 |
| Glass fiber | 100 |
| Phosphorus-Boron-Nitrogen-modified resin | 80 |
| Solid and depolymerized rubbers | 50 |
| Liquid resole resin | 40 |

| Component | Weight (g) |
| --- | --- |
| Lubricants | 40 |
| Curing agents | 30 |
| Kevlar ® aramid fiber | 20 |

All dry ingredients were weighed into containers using a scale with 0.1 gram accuracy, and the depolymerized rubber was added to a separate container using the same scale. The total combined weight of solid and liquid components was 1.0 kg. The solid rubber, abrasives, lubricants, and reinforcing materials were mixed for five minutes using a paddle mixer with rotating choppers; all other dry ingredients except for the steel fiber were then added and mixed for an additional three minutes. With the mixer plow and choppers still running, the depolymerized rubber was added over a four minute period, after which the steel fiber was introduced into the mixer. Mixing then continued for another six minutes to give a total mixing time of eighteen minutes. The contents of the mixer were then emptied into a suitable container and formed into drum-in-hat linings as described below in Examples 5–6.

EXAMPLE 5

The friction material described in Preparation 3 was weighed and compression molded at 8,000 psi and 320° F. for 200 seconds, with adequate time for degassing. Linings were then either bonded or riveted to drum shoes according to the part specifications.

EXAMPLE 6

The friction material described in Preparation 3 was weighed and compression molded at 10,000 psi and 340° F. for 180 seconds, with adequate time for degassing. Linings were then either bonded or riveted to drum shoes according to the part specifications.

Comparative Preparation 1

A conventional drum brake friction material composition for roll processing was prepared with the following ingredients:

| Component | Weight (g) |
| --- | --- |
| Abrasives | 270 |
| Steel fiber | 200 |
| Liquid cashew resin | 160 |
| Glass fiber | 100 |
| Fillers | 100 |
| Oil-modified phenolic resin | 80 |
| Lubricants | 60 |
| Curing agents | 30 |

All dry ingredients were weighed into containers using a scale with 0.1 gram accuracy, and the liquid cashew rubber was added to a separate container using the same scale. The total combined weight of solid and liquid components was 1.0 kg. The abrasives, lubricants, and reinforcing materials were mixed for five minutes using a paddle mixer with rotating choppers; all other dry ingredients except for the steel fiber were then added and mixed for an additional three minutes. With the mixer plow and choppers still running, the liquid cashew rubber was added over a four minute period, after which the steel fiber was introduced into the mixer. Mixing then continued for another six minutes to give a total mixing time of eighteen minutes. The contents of the mixer were then emptied into a suitable container and formed into drum-in-hat linings as described below in Example 7.

COMPARATIVE EXAMPLE 1

The friction material described in Comparative Preparation 1 was fed into a standard roll line in order to produce rolled linings approximately 25 feet long. The thickness and width of the rolled strips were part-specific. Linings were then subjected to an oven curing cycle and bonded or riveted onto drum shoes.

Comparative Preparation 2

A conventional friction material composition for compression molding was prepared with the following ingredients:

| Component | Weight (g) |
|---|---|
| Liquid cashew resin | 250 |
| Abrasives | 240 |
| Steel fiber | 100 |
| Liquid rubber | 100 |
| Lubricants | 100 |
| Glass fiber | 80 |
| Fillers | 80 |

All dry ingredients were weighed into containers using a scale with 0.1 gram accuracy, and the depolymerized rubber was added to a separate container using the same scale. The total combined weight of solid and liquid components was 1.0 kg. The solid rubber, abrasives, lubricants, and reinforcing materials were mixed for five minutes using a paddle mixer with rotating choppers; all other dry ingredients except for the steel fiber were then added and mixed for an additional three minutes. With the mixer plow and choppers still running, the depolymerized rubber was added over a four minute period, after which the steel fiber was introduced into the mixer. Mixing then continued for another six minutes to give a total mixing time of eighteen minutes. The contents of the mixer were then emptied into a suitable container and formed into drum-in-hat linings as described below in Comparative Examples 3–4.

COMPARATIVE EXAMPLE 2

The friction material described in Preparation 1 was weighed and compression molded at 8,000 psi and 320° F. for 200 seconds, with adequate time for degassing. Linings were then either bonded or riveted to drum shoes according to the part specifications.

COMPARATIVE EXAMPLE 3

The friction material described in Preparation 2 was weighed and compression molded at 10,000 psi and 340° F. for 180 seconds, with adequate time for degassing. Linings were then either bonded or riveted to drum shoes according to the part specifications.

Description of Test Results

To test the high temperature stability and green static friction of the linings described above in Examples 1–6 and Comparative Examples 1–3, samples were placed in an oven for an extended period of time at an elevated temperature designed to simulate the severe conditions the material would experience during severe drum-in-hat application. The linings were weighed both before and after the cure, and the weight loss due to the oven cure was recorded. In the typical rolled lining for which an example is detailed in Comparative Preparation 1, there was a weight loss of approximately 25%. In the material which used both the phosphorus-modified and phosphorus-boron-nitrogen-modified resin (Preparation 1), however, the weight loss was only 8.5%. The high weight loss in the rolled material was accompanied by excessive softness and crumbling of the lining, making the linings unusable in any application. The linings made using the modified resin according to the invention, however, remained solid and had very little chipping.

In addition to the weight loss measurements, green static friction was measured for linings that were heat-soaked at an elevated temperature for 72 hours, 120 hours, and 168 hours and for linings that were not heat-soaked. As mentioned before, the rolled linings crumbled at elevated temperatures, so meaningful friction data was unavailable for the 120 hour and 168 hour rolled linings. Tables 1 and 2 below gives the coefficient of static friction at the various heat soak times:

TABLE 1

Average Torque Friction (Forward)

| Heat Soak | Inorganic Modified resin lining (Example 1) | Inorganic Modified resin lining (Example 3) | Inorganic Modified resin lining (Example 5) | Rolled Lining (Comparative Example 1) |
|---|---|---|---|---|
| None | 10.96 | 13.45 | 11.92 | 7.53 |
| 72h @ 550° F. | 11.57 | 12.85 | 12.05 | 6.91 |
| 120h @ 550° F. | 11.17 | 11.92 | 11.51 | Not testable |
| 168h @ 550° F. | 9.44 | 10.58 | 10.54 | Not testable |

TABLE 2

Average Torque Friction (Reverse)

| Heat Soak | Inorganic Modified resin lining (Example 1) | Inorganic Modified resin lining (Example 3) | Inorganic Modified resin lining (Example 5) | Rolled Lining (Comparative Example 1) |
|---|---|---|---|---|
| None | 9.86 | 9.82 | 9.15 | 6.62 |
| 72h @ 550° F. | 10.12 | 10.12 | 11.11 | 5.63 |
| 120h @ 550° F. | 10.08 | 10.87 | 10.54 | Not testable |
| 168h @ 550° F. | 11.02 | 11.02 | 10.31 | Not testable |

Both the thermal stability of the structural properties and the good static friction performance of the linings made with the inorganic-modified resins according to the invention make for a safer and more practical lining material for drum-in-hat applications than the conventional drum brake shoe friction material.

The invention has been described in detail herein with reference to specific embodiments thereof. It is to be understood that modifications and variations from these embodiments may be made within the spirit and scope of the invention.

What is claimed is:

1. A drum-in-hat disc brake assembly including a drum brake shoe that comprises a friction material comprising a phenolic polymer resin including one or more inorganic atom-containing groups selected from the group consisting of a boron-containing group, a phosphorous-containing group, a nitrogen-containing group, a silicon-containing group, and a sulfur-containing group incorporated into its polymer chain.

2. A drum-in-hat disc brake assembly according to claim 1 wherein said phenolic polymer resin has incorporated into its polymer chain one or more inorganic atom-containing groups selected from the group consisting of a boron-containing group, a phosphorous-containing group, and a nitrogen-containing group.

3. A drum-in-hat disc brake assembly according to claim 1 wherein said phenolic polymer resin includes a boron-containing group incorporated into its polymer chain.

4. A drum-in-hat disc brake assembly according to claim 1 wherein said phenolic polymer resin includes a phosphorous-containing group incorporated into its polymer chain.

5. A drum-in-hat disc brake assembly according to claim 1 wherein said phenolic polymer resin includes a nitrogen-containing group incorporated into its polymer chain.

6. A drum-in-hat disc brake assembly according to claim 1 wherein said phenolic polymer resin includes phosphorous and nitrogen-containing groups incorporated into its polymer chain.

7. A drum-in-hat disc brake assembly according to claim 1 wherein said phenolic resin includes boron and nitrogen-containing groups incorporated into its polymer chain.

8. A drum-in-hat disc brake assembly according to claim 1 wherein said phenolic polymer resin includes boron, phosphorous, and nitrogen-containing groups incorporated into its polymer chain.

9. A drum-in-hat disc brake assembly according to claim 1 comprising a first phenolic polymer resin including a phosphorous-containing group incorporated into its polymer chain, and a second phenolic resin including a boron-containing group incorporated into its polymer chain.

10. A drum-in-hat disc brake assembly according to claim 1 comprising a first phenolic polymer resin including a phosphorous-containing group incorporated into its polymer chain, and a second phenolic resin including boron-, phosphorous-, and nitrogen-containing groups incorporated into its polymer chain.

11. A drum-in-hat disc brake assembly according to claim 1 wherein said one or more inorganic atom-containing groups are incorporated into said polymer chain in place of methylene linking groups.

12. A drum-in-hat disc brake assembly according to claim 1 wherein said friction material further comprises bauxite.

13. A drum-in-hat disc brake assembly according to claim 12 wherein said friction material further comprises attapulgite clay.

14. A drum-in-hat disc brake assembly according to claim 1 wherein said friction material further comprises attapulgite clay.

15. A drum-in-hat disc brake assembly according to claim 1 that is adapted for use on a motor vehicle having a gross vehicle weight of at least 4000 pounds.

16. A drum-in-hat disc brake assembly according to claim 15 that is adapted for use on a rear wheel of said motor vehicle.

17. A drum-in-hat disc brake assembly according to claim 1 that is adapted for use on a rear wheel of a motor vehicle.

\* \* \* \* \*